(12) United States Patent
Conti et al.

(10) Patent No.: US 10,479,471 B2
(45) Date of Patent: Nov. 19, 2019

(54) FUSELAGE SKIN PANEL CONNECTION SYSTEM AND METHOD FOR CONNECTING SKIN PANELS

(71) Applicant: The Boeing Company, Chicago, IL (US)

(72) Inventors: Angelina M. Conti, State College, PA (US); Robert E. Grip, Rancho Palos Verdes, CA (US); Ted K. Rothaupt, Lancaster, CA (US)

(73) Assignee: The Boeing Company, Chicago, IL (US)

( * ) Notice: Subject to any disclaimer, the term of this patent is extended or adjusted under 35 U.S.C. 154(b) by 387 days.

(21) Appl. No.: 15/364,473

(22) Filed: Nov. 30, 2016

(65) Prior Publication Data

US 2018/0148153 A1    May 31, 2018

(51) Int. Cl.
*B64C 1/12* (2006.01)
*B64C 1/06* (2006.01)
*B64F 5/00* (2017.01)

(52) U.S. Cl.
CPC ............... *B64C 1/12* (2013.01); *B64C 1/061* (2013.01); *B64F 5/00* (2013.01)

(58) Field of Classification Search
CPC .. B64C 1/12; B64C 1/08; B64C 1/061; B64C 3/26; B64C 1/068; B64C 1/00; B64F 5/00
See application file for complete search history.

(56) References Cited

U.S. PATENT DOCUMENTS

| | | | | |
|---|---|---|---|---|
| 2,835,360 A | * | 5/1958 | Bernardoni | E06B 3/26301 285/223 |
| 3,032,603 A | * | 5/1962 | Whitley | H01R 4/186 174/168 |
| 4,991,991 A | * | 2/1991 | Ito | C04B 37/005 403/272 |
| 5,134,812 A | * | 8/1992 | Hoffman | F16B 1/0014 403/305 |
| 6,718,713 B2 | * | 4/2004 | McKague, Jr. | B29C 65/56 52/309.13 |

(Continued)

*Primary Examiner* — Assres H Woldemaryam
(74) *Attorney, Agent, or Firm* — Walters & Wasylyna LLC

(57) ABSTRACT

An aircraft is provided. The aircraft includes truss elements configured to form a space frame fuselage, and skin panels connected with the truss elements and configured to form a skin over said space frame fuselage. The skin panels are movable relative to one another so as to prevent loading of the space frame fuselage from inducing loading in the skin. The aircraft includes a fitting. The fitting includes a first intermediate portion, a first outer portion, and a first inner portion. The first outer and inner portions are spaced apart from each other and interconnected by the first intermediate portion. The skin panels include first and second skin panels that are adjacent to each other. The first skin panel has a first end portion that is adjacent to a second end portion of the second skin panel. The fitting is positioned between the first and second skin panels such that the first and second end portions of the skin panels extend between the first inner and outer portions. The fitting is configured to enable the first and second skin panels to move towards each other along a first plane of first outer and inner surfaces of the first and second skin panels while constraining non-planar movement of the skin panels with respect to the first plane.

20 Claims, 17 Drawing Sheets

(56) References Cited

U.S. PATENT DOCUMENTS

| | | | | |
|---|---|---|---|---|
| 7,914,223 | B2* | 3/2011 | Wood | B64C 1/06 403/232.1 |
| 8,082,667 | B2* | 12/2011 | Kulesha | B64C 1/06 29/897.3 |
| 8,128,025 | B2 | 3/2012 | Rawdon et al. | |
| 8,515,677 | B1* | 8/2013 | Vail | E21B 4/04 702/12 |
| 8,720,824 | B2* | 5/2014 | Martinez Fernandez | B64C 1/26 244/123.1 |
| 2008/0272236 | A1* | 11/2008 | Rawdon | B64C 1/08 244/118.1 |
| 2009/0236473 | A1* | 9/2009 | Rawdon | B64C 1/08 244/120 |
| 2015/0344156 | A1* | 12/2015 | Vail, III | B64F 5/60 701/32.8 |
| 2018/0148153 | A1* | 5/2018 | Conti | B64C 1/061 |

\* cited by examiner

FUSELAGE SKIN PANEL CONNECTION SYSTEM AND METHOD FOR CONNECTING SKIN PANELS

FIELD

This application relates to a connection system for skin panels of a fuselage and method for connecting the skin panels.

BACKGROUND

The skin of an aircraft typically provides aerodynamic surfaces on aircraft components such as the fuselage. The skin panels that form the skin may be subjected to structural and aerodynamic loads. Aerodynamic pressure loading, which is the primary loading on the skin, arises from a pressure differential between the inside and outside of the aircraft. The pressure loading is approximately orthogonal to the skin surface in an out-of-plane direction. Stringers and frames are typically added to stabilize the skin from buckling due to structure loads. The skin itself typically is thickened, or stiffened, to avoid buckling under some load conditions. A common limitation to the weight of a fuselage skin panel is the inability to separate the structural loads from the aerodynamic loads. In the case of an unpressurized fuselage, the skin is sized by the loads that are associated with aerodynamic loads only. In order to transfer the fuselage bending loads to a separate structural element, the skin must be able to move independently of the structural element, while still maintaining an aerodynamic outer surface.

One solution is to incorporate fuselage bending loads in the skin. While this approach makes sense for a pressurized fuselage, it results in a large weight increase due to the increase in skin thickness to account for the additional loads.

SUMMARY

In one embodiment, an aircraft is provided. The aircraft includes truss elements configured to form a space frame fuselage, and skin panels connected with the truss elements and configured to form a skin over the space frame fuselage. The skin panels are movable relative to one another so as to prevent deflections of the space frame fuselage from inducing loading in the skin. The aircraft includes a fitting. The fitting includes a first intermediate portion, a first outer portion, and a first inner portion. The first outer and inner portions are spaced apart from each other and interconnected by the first intermediate portion. The skin panels include first and second skin panels that are adjacent to each other. The first skin panel has a first end portion that is adjacent to a second end portion of the second skin panel. The fitting is positioned on the first and second skin panels such that the first and second end portions of the skin panels extend between the first inner and outer portions. The fitting is configured to enable the first and second skin panels to move towards each other along a first plane of first outer and inner surfaces of the first and second skin panels while constraining non-planar movement of the skin panels with respect to the plane.

In another embodiment, an aircraft is provided. The aircraft includes truss elements configured to form a space frame fuselage, and skin panels connected with the truss elements and configured to form a skin over said space frame fuselage. The skin panels are movable relative to one another so as to prevent deflections of the space frame fuselage from inducing loading in the skin. The aircraft also includes a support beam. The support beam is attached to a plurality of the skin panels. The aircraft includes an elongated link. The link has a first end movably connected to the support beam. The link has as second end movably connected to one of the truss elements. The support beam is further configured to transfer loading of at least one of the skin panels through the link to the space frame fuselage. The movable connection of the second end of the link is configured to constrain motion of the at least one of the skin panels in a direction orthogonal to the fuselage while permitting at least one of vertical and longitudinal motion or both vertical and longitudinal motion of the at least one of the skin panels relative to the fuselage. The link includes a portion configured to fail at abnormal loads applied to the link.

In another embodiment, a method is provided. The method includes installing a plurality of skin panels over a frame of a fuselage such that the skin panels are spaced apart from each other by a first gap, and installing a fitting on adjacent first and second skin panels. The fitting is configured to enable the first and second skin panels to move towards each other along a plane of outer and inner surfaces of the first and second skin panels while constraining non-planar movement of the skin panels with respect to the plane. Installing the fitting between adjacent first and second skin panels includes positioning an outer piece of the fitting on the outer surface of the skin panels over the first gap, positioning an intermediate portion of the fitting between the first and second skin panels at the first gap, positioning an inner piece of the fitting on the intermediate portion such that a first end of the first skin panel extends between the outer and inner pieces and a second end of the second skin panel extends between the outer and inner pieces, and fastening the outer piece, intermediate portion, and inner piece together.

Other embodiments of the disclosed fastener and associated structural assembly will become apparent from the following detailed description, the accompanying drawings and the appended claims.

DETAILED DESCRIPTION

Skin panels are connected with the fuselage and configured to form a skin over the fuselage. The panels are movable relative to one another so as to prevent distortional loading of the fuselage from inducing in-plane loading in the skin. Various implementations are contemplated for use in relation to a space frame fuselage structure, e.g., a truss fuselage structure that is not pressurized.

Figure 1:
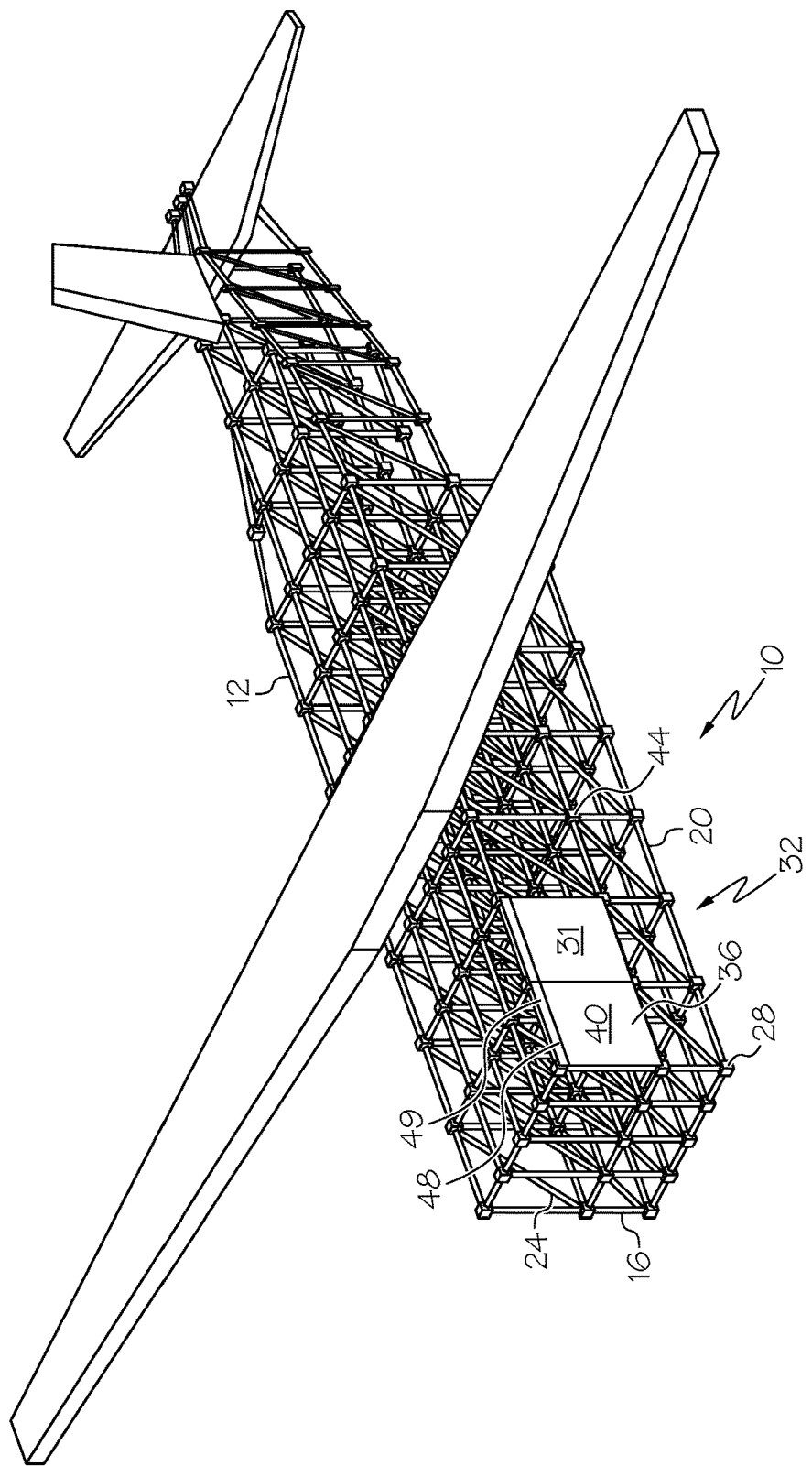
FIG. 1 is a perspective view of selected portions of an aircraft having a skin panel system with a portion of the skin panel system being shown according to various embodiments.

One configuration of an aircraft 10 having a fuselage structure for which a skin may be provided is indicated generally in FIG. 1 (selected portions of the aircraft being shown). A space frame fuselage structure 12 includes a plurality of vertical truss elements 16, horizontal truss elements 20, and diagonal truss elements 24. The elements (16, 20, 24) are shown in phantom lines in the figures and may include cylindrical and rectangular tube elements. Truss elements (16, 20, 24) generally are configured to converge at, or alternatively, in close proximity to the rectangular solid node elements 28. The fuselage structure 12 is unpressurized although the aircraft 10 has a pressurized crew compartment (not shown). The structure 12 is configured to carry standardized, modular containers that may be connected to the structure 12 at discrete points, i.e., at various node elements 28. When the fuselage structure 12 is highly loaded, distances between various node elements can change, thereby changing the shape of the fuselage structure as a result of the loading.

One configuration of a skin (of which a portion is shown in FIG. 1) for enclosing the fuselage structure 12 is indicated generally by reference number 32. The skin 32 provides streamlining and weather protection for the fuselage 12. As further described below, the skin 32 is configured to accommodate in-plane distortion of the fuselage structure 12 and to transfer aerodynamic pressure loading into the structure 12. For example, in the case of side panels 40, the fuselage structure may distort variously in the vertical-longitudinal plane that is essentially parallel to the plane of the side panels 40. The aerodynamic pressure loading is approximately orthogonal to the surface of the skin 32 in an out-of-plane direction.

In various implementations, the skin 32 includes a plurality of substantially rigid skin panels 36. Four exemplary panels 36 are shown in FIG. 1. Two of the panels 36 are side panels 40 oriented vertically and located forwardly on a side 44 of the fuselage 12. The two other exemplary panels 36 shown in FIG. 1 are smaller corner panels 48 located directly above the side panels 40. When the fuselage structure 12 is covered by panels 36, relative motion of the panels 36, e.g., one panel "sliding" relative to another, permits flexure of the fuselage structure 12 with negligible stresses induced between the fuselage structure and the skin panels.

Figure 2:
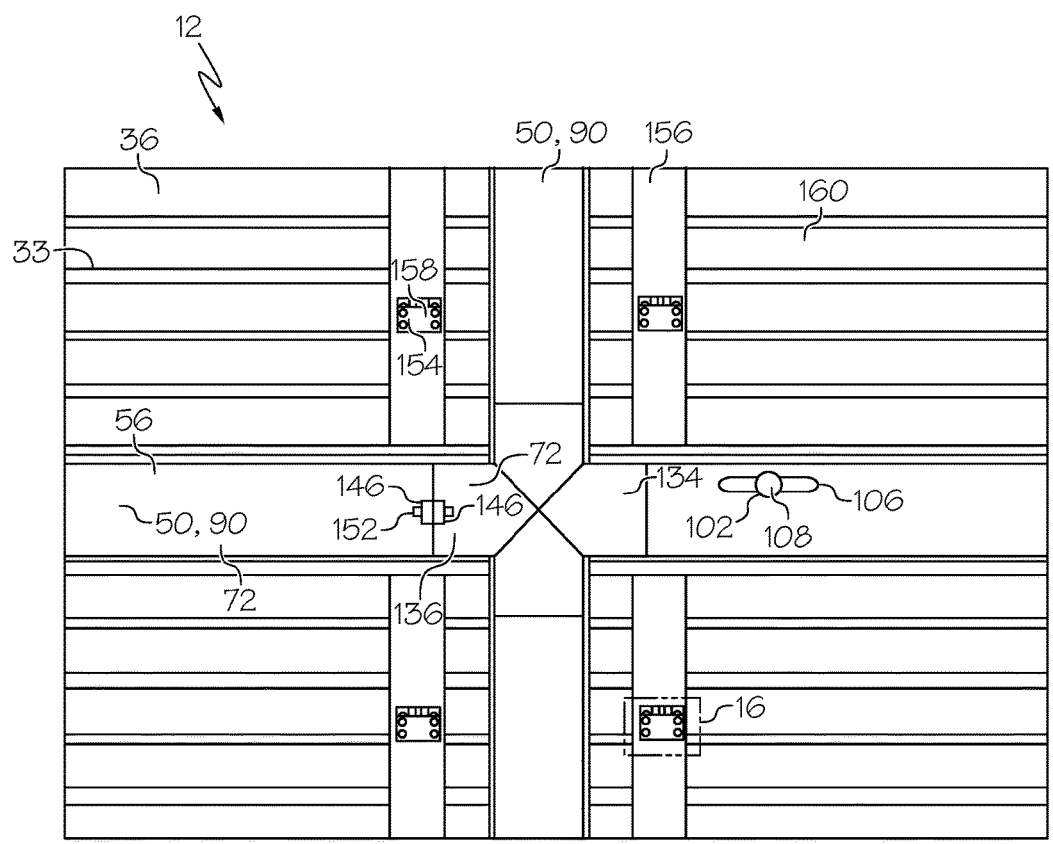
FIG. 2 is a view, taken from inside the fuselage structure and looking outboard, of an inboard side of the fuselage structure showing the skin panels and related elements according to various embodiments.

The skin panels have an outer surface 31 and an inner surface 33 (FIG. 2). The outer surfaces 31 of the skin panels 36 result in the skin 32 having an overall shape determined primarily by aerodynamic considerations. Size(s) of skin panels may be determined based, e.g., on considerations as to ease of mounting to the underlying structure, number of sliding joints, and manufacturing considerations (e.g., size of panel versus part count). It should be noted generally that panels could have various shapes and sizes dependent, e.g., on location of a particular panel relative to a fuselage. A panel could have any number of sides and/or a partially or completely curved perimeter. Furthermore, a panel is not necessarily flat. For example, the corner panels 48 partially wrap an edge 49 of the fuselage structure 12. A single panel could be flat, curved and/or angled in various areas of the panel. A panel could have substantially any shape, whether regular or irregular.

Figure 3:
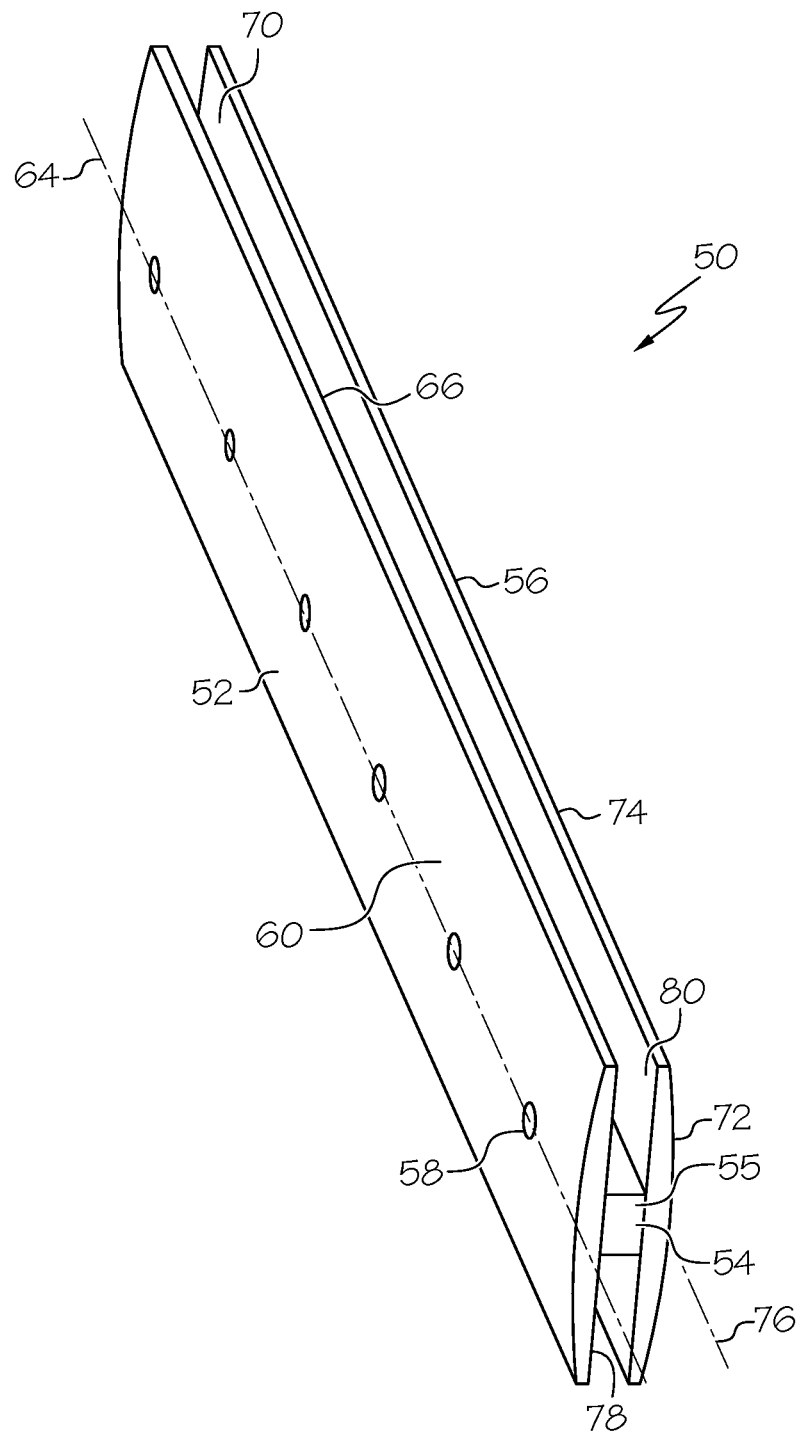
FIG. 3 is a perspective view of the H-fitting according to an embodiment.

FIG. 2 illustrates a portion of the fuselage 12 in which skin panels 36 are isolated from each other in a way that enables independent finite planar motion while constraining out of plane motion relative to the skin panel 36. The connection system for the panels includes an H-fitting 50. As illustrated in FIG. 3, one embodiment of the H-fitting 50 includes an outer piece 52, intermediate portion 54 and an inner piece 56 that are all connected together by fasteners 58. The outer piece 52 has a generally rectangular shape with a gabled exterior surface 60 and a flat interior surface 62 (FIG. 8) (relative to the outer piece). The exterior surface 60 tapers inwardly going in the lateral direction from the longitudinal center line 64 of the outer piece 52 to a first side 66 that extends longitudinally. The exterior surface 60 also tapers inwardly going in the lateral direction from the longitudinal center line 64 of the outer piece 52 to a second side 66 that is opposite the first side 66. The exterior surface 60 is also configured to have a smooth aerodynamic surface since the exterior surface 60 is also part of the outer surface of the fuselage 12. The inner piece 56 has a generally rectangular shape with a gabled exterior surface 72 and a flat interior surface 70 (relative to the inner piece 56). The exterior surface 72 tapers inwardly going in the lateral direction from the longitudinal center line 76 of the inner piece 56 to a first side 74 that extends longitudinally. The exterior surface 72 also tapers inwardly going in the lateral direction from the longitudinal center line 76 of the inner piece 56 to the second side 74 opposite the first side 74. The intermediate portion 54 comprises an intermediate piece 55 that is rectangular in shape and is sandwiched between the outer and inner pieces 52, 56 at the longitudinal center lines 64, 76 to define opposite first and second longitudinal extending pockets 78, 80.

Figure 4:
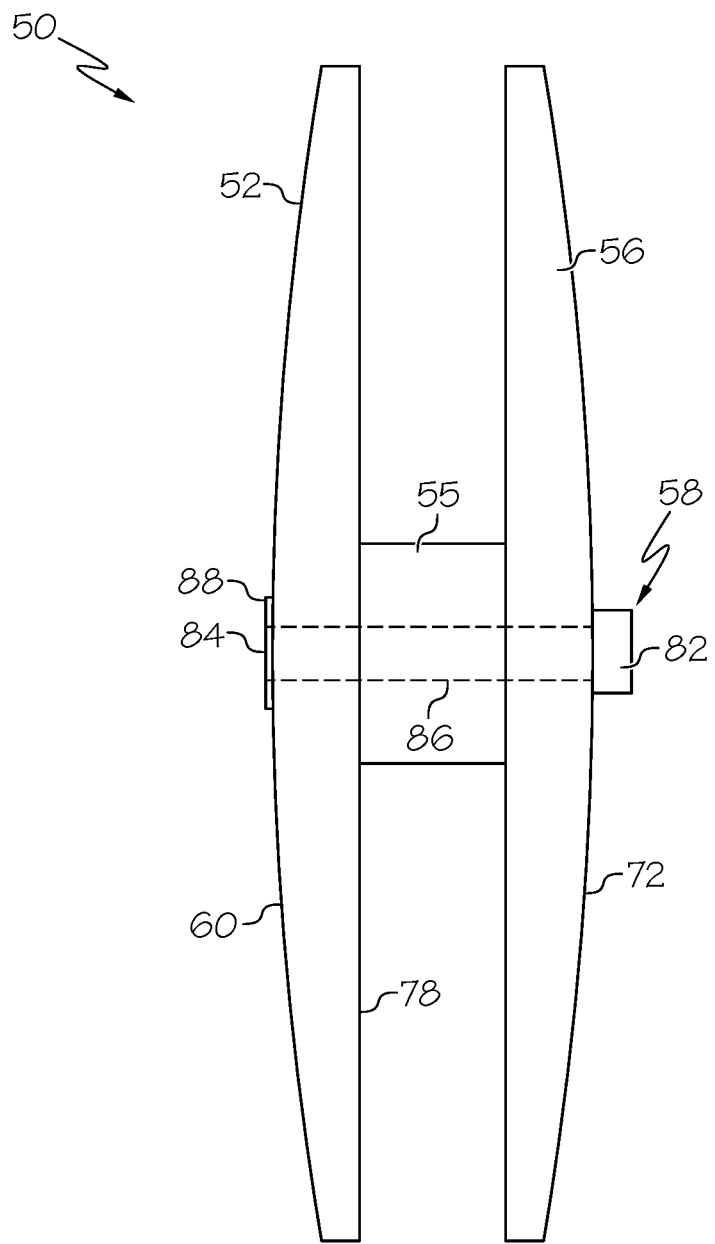
FIG. 4 is a side view of the H-fitting of FIG. 3.

As illustrated in FIG. 4, the fastener 58 may comprise any suitable fastener such as a nut 82 and bolt 84 arrangement. When the H fitting 50 is assembled, a shaft 86 of the bolt 84 extends through the outer piece 52, intermediate piece 55, and inner piece 56 such that a head 88 of the bolt 84 abuts against the exterior surface 60 of the outer piece 52. The nut 82 is fastened on the threaded free end of the shaft 86 until the nut 82 abuts against the exterior surface 72 of the inner piece 56 to fasten the outer piece 52, intermediate piece 55, and inner piece 56 together. Alternatively, non-threaded fasteners may be used, such as lockbolts or other fastening systems. As illustrated in FIG. 3, the outer piece 52, intermediate piece 55, and inner piece 56 may be fastened together by a plurality of the fasteners 58 that are spaced apart from each other along the longitudinal center line. The pieces 52, 55, 56 may be formed of any suitable material such as metal. Alternatively, or in addition, the intermediate piece 55 may be welded to the outer piece 52 and/or inner piece 56 or adhesively attached to the outer piece 52 and/or inner piece 56.

Figure 8:
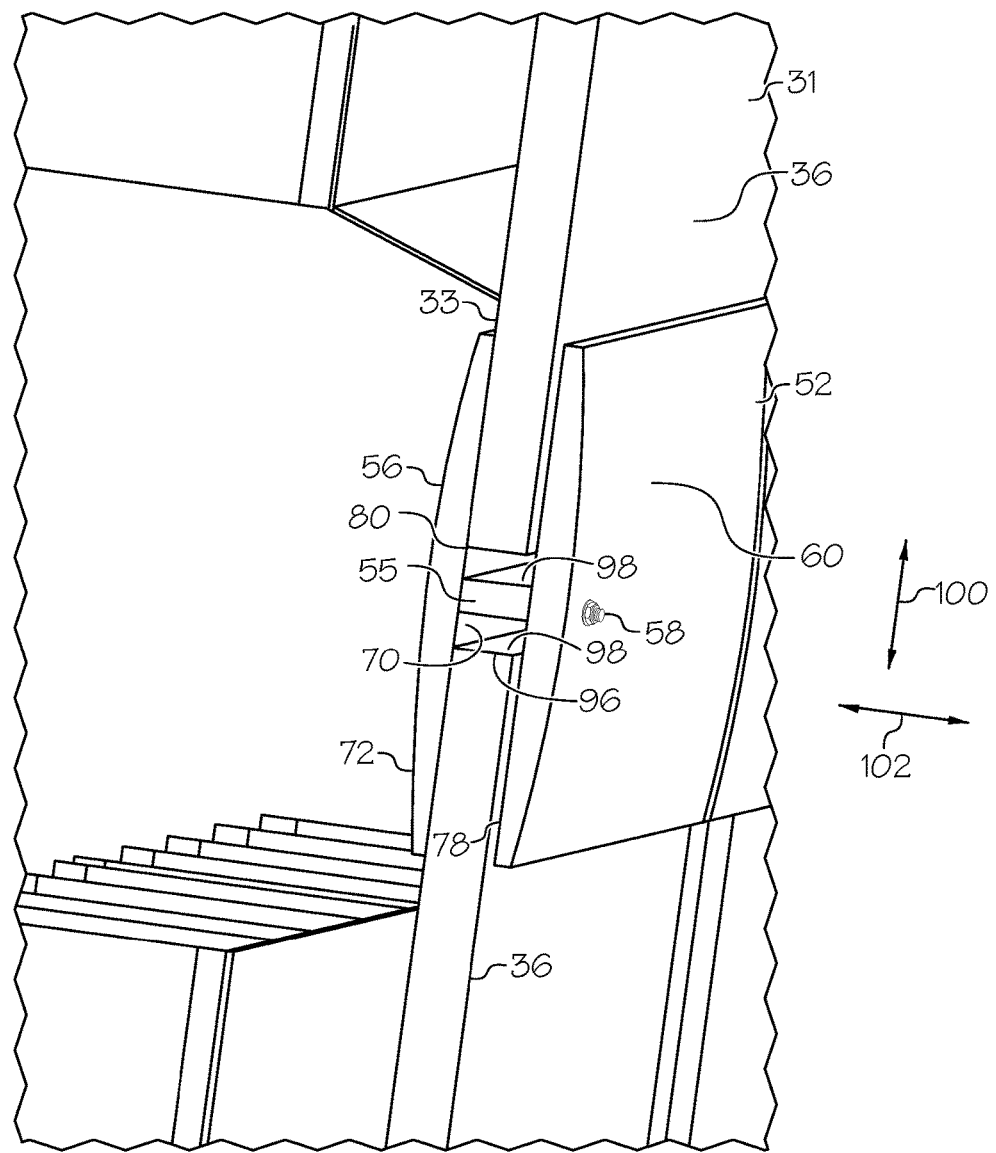
FIG. 8 is a perspective view of a portion of the H-fitting of FIG. 3 connecting first and second skin panels.

FIG. 8 illustrates the H-fitting 50 connecting first and second skin panels 36 together. The first skin panel 36 extends between the outer and inner pieces 52, 56 into the first pocket 78 such that the end 96 of the skin panel 36 is in close proximity to the intermediate piece 55 and separated from the intermediate piece 55 by a gap 98. Similarly, the second skin panel 36 extends between the outer and inner pieces 52, 56 into the second pocket 80 such that end 96 of the skin panel 36 is in close proximity to the intermediate piece 55 and separated from the intermediate piece 55 by a gap 98. The outer surface 31 of each skin panel 36 in the pockets 78, 80 is flushed with the interior surface 62 of the outer piece 52, and the inner surface 33 of each skin panel in the pockets 78, 80 is flushed with the interior surface 70 of the inner piece 56. The gaps 98 allow the skin panels 36 to move a predetermined distance in the planar direction of the skin panel as indicated by arrows 100, while the outer and inner pieces 52, 56 constrain non-planar motion of the skin panel 36 as indicated by arrows 102, which show one example of non-planar motion that is orthogonal to the planar direction of the skin panel.

Figure 5:
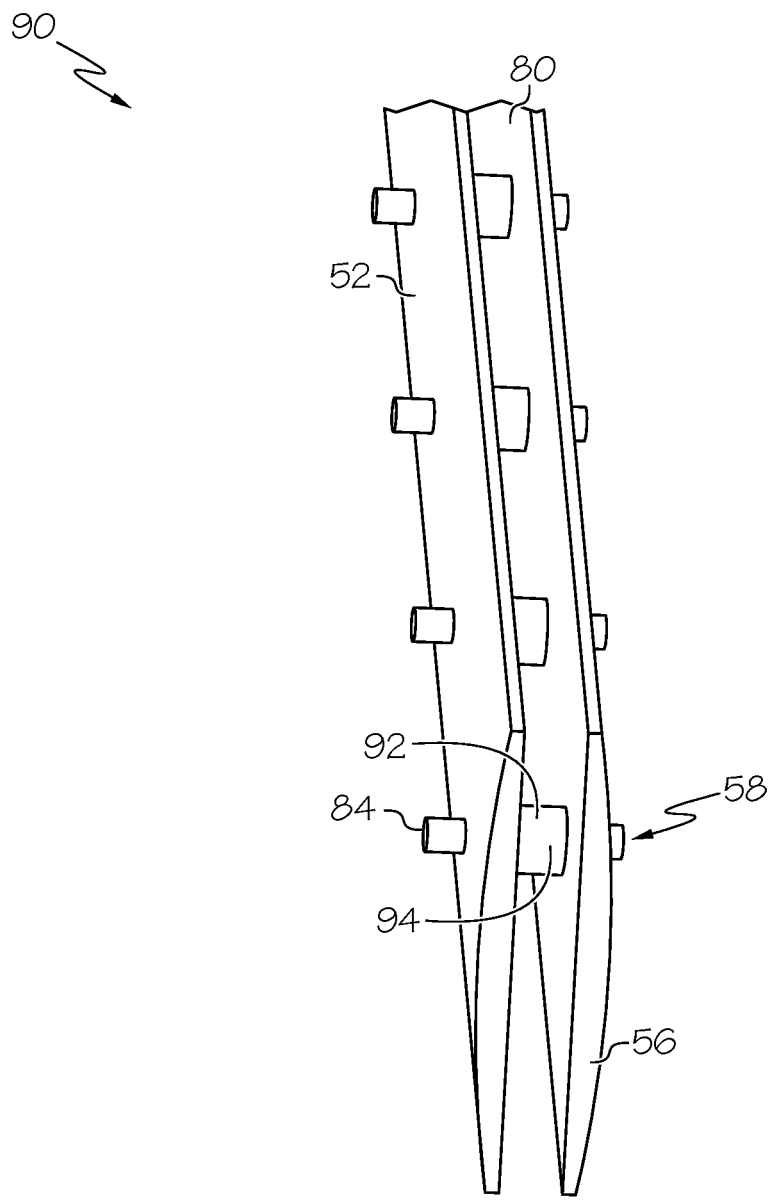
FIG. 5 is a perspective view of the H-fitting according to another embodiment.
Figure 6:
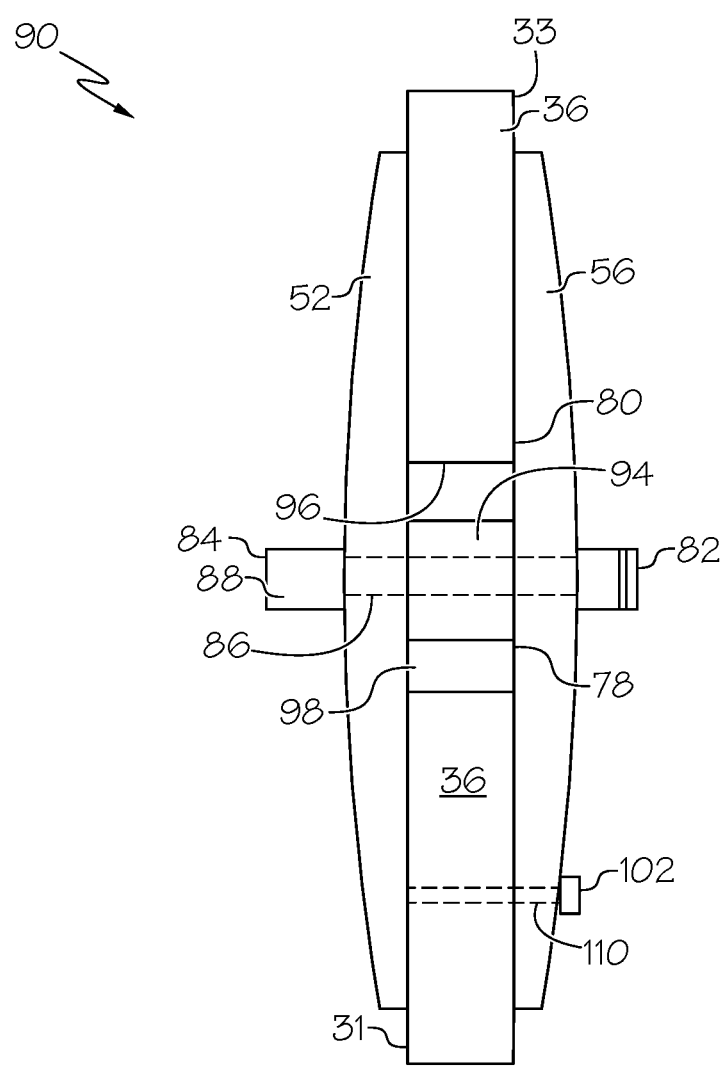
FIG. 6 is a side view of the H-fitting of FIG. 5 connecting first and second skin panels.

FIGS. 5 and 6 illustrate another embodiment that includes a different fastener arrangement. The embodiment of FIGS. 5 and 6 is similar to the embodiment illustrated in FIGS. 3 and 4 except for the different subject matter described below. Elements in the embodiment illustrated in FIGS. 5 and 6 that are similar in structure and function to the embodiment illustrated in FIGS. 3 and 4 will be described with the same reference numbers.

In the embodiment illustrated in FIGS. 5 and 6, the H-fitting 90 includes the outer piece 52, the intermediate portion 92, and the inner piece 56 that are all connected together by the fasteners 58. The intermediate portion 92 comprises cylindrical spacers 94 that are spaced apart from each other along the longitudinal center lines 64, 76 (FIG. 3) of the outer and inner pieces 52, 56. In particular, each cylindrical spacer 94 is sandwiched between the outer and inner pieces 52, 56 and may abut against the outer and inner pieces 52, 56. The spacers 94 may be welded, adhesively fastened or held in place by friction to the outer piece 52 and/or inner piece 56. When the H-fitting 90 is assembled, a shaft 86 (FIG. 6) of the bolt 84 extends through the outer piece 52, spacer 94, and inner piece 56 such that the head 88 of the bolt 84 abuts against the exterior surface 60 of the outer piece. A nut 82 is fastened on the threaded free end of the shaft 86 and abuts against the exterior surface 72 of the inner piece 56 to fasten the outer piece 52, spacer 94, and inner piece 56 together. As illustrated in FIG. 5, the outer piece 52, spacers 94, and inner piece 56 may be fastened together by a plurality of the nut and bolt type fasteners 58 that are spaced apart from each other along the longitudinal center lines 64, 76.

In one alternative arrangement for the embodiments of FIGS. 3-6, the bolt 84 may be oriented such that the head 88 of the bolt 84 abuts against the inner piece 56 and the nut 82 abuts against the outer piece 52. In another alternative arrangement, the H-fitting 50 may be integrally formed in one piece. FIG. 6 shows the H-fitting 90 connecting first and second skin panels 36 together. The first skin panel 36 extends between the outer and inner pieces 52, 56 at the first pocket 78 such that the end 96 of the skin panel 36 is in close proximity to the spacer 94 and separated from the spacer 94 by a gap 98. Similarly, the second skin panel 36 extends between the outer and inner pieces 52, 56 at the second pocket 80 such that the end 96 of the skin panel 36 is in close proximity to the spacer 94 and separated from the spacer 94 by a gap 98. The outer surface 31 of each skin panel 36 in the pockets 78, 80 is flushed with the interior surface 62 of the outer piece 52, and the inner surface 33 of each skin panel in the pockets 78, 80 is flushed with the interior surface 70 of the inner piece 56.

To prevent the H-fitting 50, 90 from separating from the skin panels 36, each H-fitting is fastened to one of the skin panels by a bolt 102 as illustrated in FIGS. 2 and 6. In particular, the bolt 102 has a shaft 110 (FIG. 6) that extends through a slot 106 (FIG. 2) formed in the inner piece 56 of the H-fitting 50, 90 and is fixed to the skin panel 36. The slot 106 may extend longitudinally and laterally at predetermined distances along the inner piece 56. A head 108 of the bolt 102 is sized larger than the width of the slot 106 and slidably engages the exterior surface 72 of the inner piece 56, but the shaft 110 of the bolt 102 is smaller than the width and length of the slot 106 to enable the skin panel 36 to move a predetermined distance longitudinally and laterally in the planar direction of the skin panel 36 yet still be fastened to the H-fitting 50, 90. Alternatively, the shaft 110 may abut the lateral edges of the slot 106 such that the skin panel 36 may only be allowed to move longitudinally. Alternatively, the slot 106 may be formed in the outer piece 52 with the shaft 110 of bolt 102 extending through the slot 106 and fixed to the skin panel 36, and the head 108 slidably engaging the exterior surface 60 of the outer piece 52. Alternatively, one slot 106 may be formed in the inner piece 56 and another slot 106 maybe formed in the outer piece 52 opposite the slot 106 of the inner piece 56 with the shaft 110 of the bolt 102 extending through the slots 106 and the skin panel 36, and the head 108 and a nut fastened to the threaded free end of the shaft 110 and slidably engaging their respective exterior surfaces 60, 72 of the outer and inner pieces 52, 56.

Figure 7:
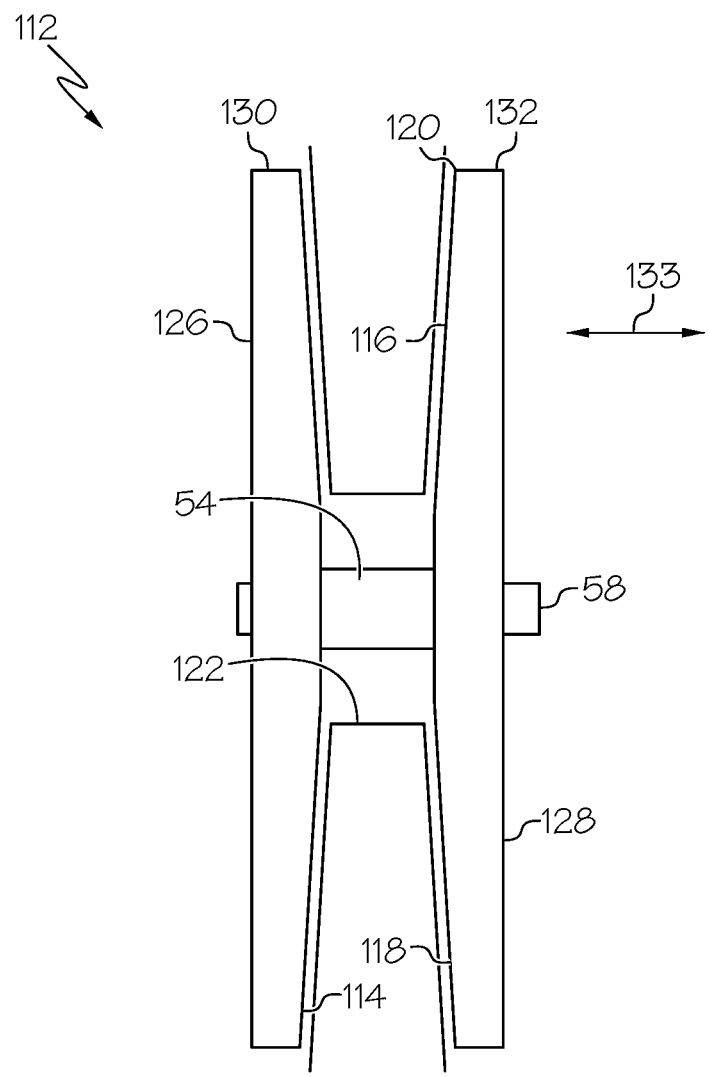
FIG. 7 is a side view of the H-fitting connecting first and second skin panels according to another embodiment.

FIG. 7 illustrates another embodiment of an H-fitting 112. The embodiment of FIG. 7 is similar to the embodiment illustrated in FIGS. 3 and 4 or FIGS. 5 and 6 except for the different subject matter described below. Elements in the embodiment illustrated in FIG. 7 that are similar in structure and function to the embodiment illustrated in FIGS. 3 and 4 or FIGS. 5 and 6 will be described with the same reference numbers. The H-fitting 112 has outer and inner pieces 126, 128 with interior surfaces 114, 116 that taper outwardly going in the lateral direction from the center lines 64, 76 to opposite first and second sides 130, 132 to define wedge shape pockets 118, 120 that receive the corresponding ends 122 of skin panels 124. The skin panels 124 are tapered inwardly going towards the ends 122 with the tapered surfaces facing and flushed with the interior surfaces 114, 116 of the outer and inner pieces 126, 128, such that a compressive force in the approximate direction as indicated by arrows 133 is produced by the outer and inner pieces 126, 128 upon the surfaces of the skin panels 124 facing the interior surfaces 114, 116.

Figure 9:
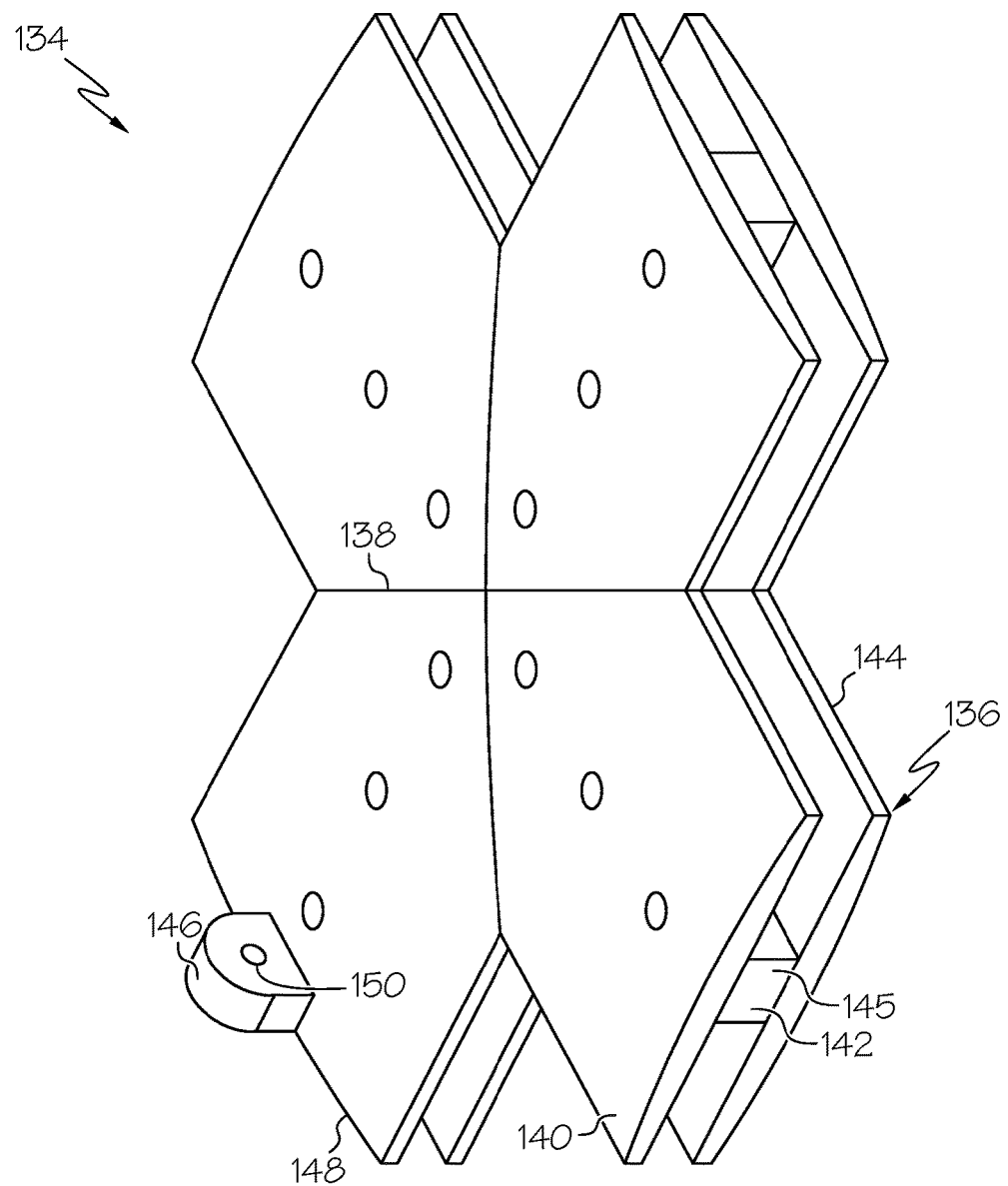
FIG. 9 is a perspective view of the corner H-fitting assembly according to an embodiment.

The aircraft 10 may also include a corner H-fitting assembly 134 as seen in FIGS. 2 and 9. As illustrated in FIG. 9, the corner H-fitting assembly 134 includes four H-fitting portions 136. Each H-fitting portion 136 includes an inner end 138 (relative to the H-fitting assembly 134) that has opposite sides that converge towards the edge of the inner end to define an arrow shape. The four H-fitting portions 136 are then fitted to each other such that opposing sides of inner ends of adjacent H fitting portions 136 abut each other to define a cross shaped corner H-fitting assembly 134. Alternatively, more or less fitting portions 136 may be connected to each other and spaced from each other around a periphery of the corner fitting assembly 134.

As seen in FIG. 9, each H-fitting portion 136 includes an outer piece 140, intermediate portion 142, and inner piece 144 that are fastened together by fasteners 58. The intermediate portion 142 is sandwiched between the outer and inner pieces 140, 144 at the center lines 64, 76 of the outer and inner pieces 140, 144. The intermediate portion 142 may be an intermediate piece 145 that extends along the length of the fitting portion 136 and then fastened to the outer and inner pieces 142, 144 by the nut and bolt arrangement as disclosed in the embodiment of FIGS. 3 and 4. Alternatively, the intermediate portion 142 may comprise a plurality of spacers that are spaced apart along the length of the H-fitting portion 136 with each spacer fastened to the outer and inner pieces by the nut and bolt arrangement similar to that shown in FIGS. 5 and 6. In another alternative arrangement, the H-fitting portion 136 may be integrally formed in one piece. In all other aspects, the H-fitting portion 136 is similar to the H-fittings 50, 90 for the embodiments shown in FIGS. 3-6.

Figure 10:
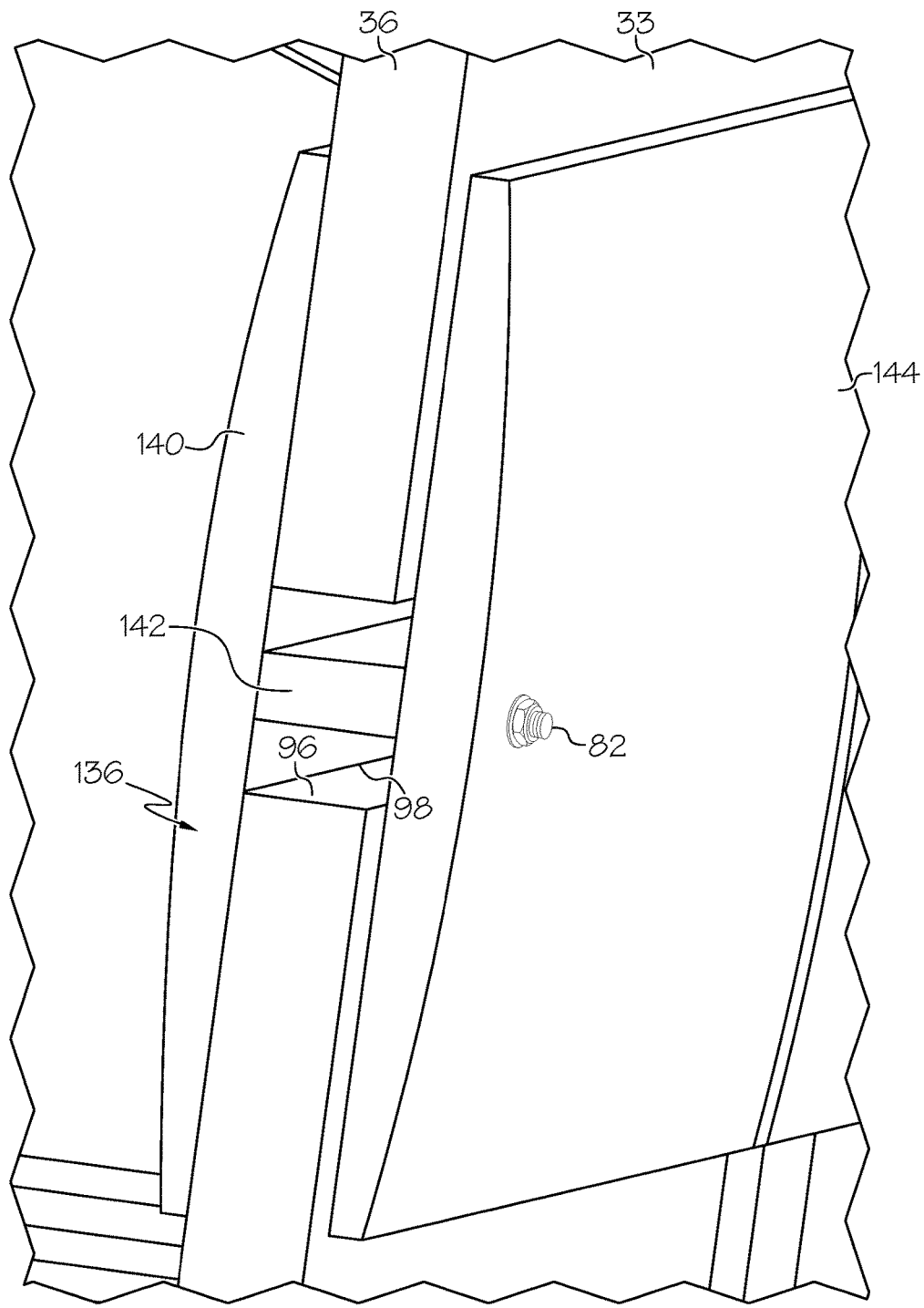
FIG. 10 is a perspective view of a portion of the corner H-fitting assembly of FIG. 9 connecting first and second skin panels.

Each of the H-fitting portions 136 connects two skin panels as shown in FIG. 10. Referring to FIG. 10, the first skin panel 36 extends into the first pocket 78 such that the end 96 of the skin panel 36 is in close proximity to the intermediate portion 142 and separated from the intermediate portion by a gap 98. Similarly, the second skin panel 36 extends into the second pocket 80 such that the end 96 of the skin panel 36 is in close proximity to the intermediate portion 142 and separated from the intermediate portion 142 by a gap 98. The gaps allow the skin panels 36 to move in the planar direction of the skin panel 36, while the outer and inner pieces 140, 144 constrain non-planar motion of the skin panels 36. Alternatively, similar to the embodiment shown in FIG. 7, the interior surfaces for each pocket of each fitting portion may taper outwardly going from the center line to the longitudinal ends to define a wedge shape pocket that receives the ends 122 of the skin panels.

To prevent the corner H-fitting assembly 134 from separating (e.g. falling off the skin panels) from the system, the corner H-fitting assembly 134 is connected to an adjacent H-fitting 50, 90. In particular, as illustrated in FIG. 2, an inverted u-shaped flange member 146 is mounted on the exterior surface 72 of the inner piece 144 at the outer end 148 (FIG. 9) of an H-fitting portion 136. Another inverted u-shaped flange member 146 is mounted on the exterior surface 72 of the inner piece 56 of an H-fitting 50, 90 at a lateral end adjacent the H-fitting portion 136 with the other flange member 146. Alternatively, the flange member may be integrally formed in one piece with the inner piece 56, 144. Alternatively or in addition, the flange member 146 for the H-fitting corner assembly 134 may be mounted on the exterior surface 60 of the outer piece 140 at the outer end 148 of an H-fitting portion 136 as seen in FIG. 9, and the flange member 146 for the adjacent H-fitting 50, 90 may be mounted on the exterior surface 60 of the outer piece 52 of the adjacent H-fitting 50, 90. Each of the flange members 146 includes a bolt receiving aperture 150 (FIG. 9) that is aligned with the bolt receiving aperture 150 of the other flange member 146. As seen in FIG. 2, a bolt 152 extends through the aligned bolt receiving apertures 150 and fastens the corner H-fitting assembly 134 to the H-fitting 50, 90. Alternatively, a clamping device or other fastening method may be used to clamp inverted u-shaped flange members 146.

As illustrated in FIG. 2, the aircraft may include standoff links 154 that connect the non-structural skin panels 36 to space frame fuselage structure 12 and isolate the loads to only the fuselage structure 12. Vertical support beams 156 are attaches to the skin panels 36 to provided stiffening strength. The standoff link 154 may be arranged so that they would not conflict with the space frame 12 as it flexes. The standoff links 154 are adjustable in length so that the skin panel 36 may be located with substantial precision relative to the space frame 12 and other panels 36.

The standoff links 154 may include a plurality of orthogonal links 158 oriented to transfer loads that are orthogonal to the skin panel 36. The links 158 are approximately orthogonal to the inboard side 160 of the skin panels so that they are aligned with the direction of primary aerodynamic pressure load. The orthogonal links 158 are mounted to the support beams to connect the space frame structure 12 to the support beams 156. Primary orthogonal loads are transferred via the links 158 spaced longitudinally along the support beams 156 as shown in FIG. 2. The support beams 156 maybe vertical as shown in FIG. 2, horizontal, or any other orientation.

Figure 11:
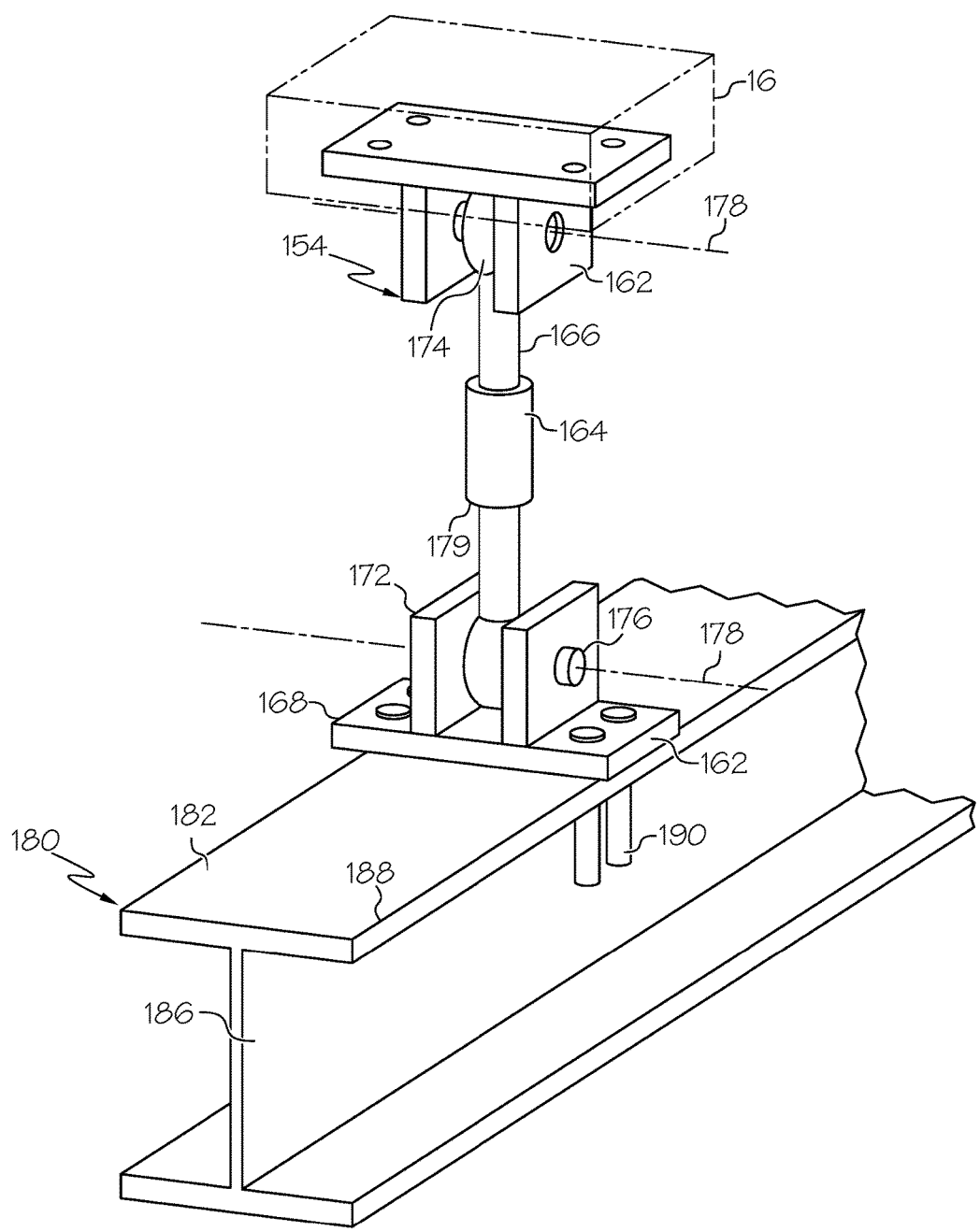
FIG. 11 is a perspective view of the standoff link connected to an I-beam and truss element according to an embodiment.

The standoff link 154 may be mounted to the support beams 156 in a variety of ways to transfer the orthogonal loads to the support beams 156. FIG. 11 shows one embodiment in which the link 154 is attached between a truss element 16 (shown in phantom lines) of the space frame 12 and a panel support beam 156 (used as a stiffening beam) via two opposing fittings 162. The link 154 includes a link body 164 and two rod ends 166 that are rotatably connected to respective fittings 162.

In this embodiment, the fitting 162 is used to directly attach the standoff link 154 to the stiffening beam 156. Each of the fittings 162 includes a rectangular base plate 168. The base plate 168 includes two pairs of bolt receiving holes 170 (FIG. 14) located on the opposite lateral ends of the base plate 168. Alternatively, there may be more or less bolt receiving holes 170 than the two pairs shown in FIG. 14. Opposite support plates 172 are mounted on the base plate 168 and are located between the pairs of holes 170. The support plates extend in the orthogonal direction from the base plate and include bolt receiving bores that are aligned with each other. Alternatively, the support plates may extend outward or otherwise oblique from the base plate 168.

Each of the rod ends 166 includes a toroid shaped rotation head 174. The head or lug 174 extends between the support and a bolt 176 slidably extends through apertures in the head 174 and support plates 172 and rotatably connects the fitting 162 to the rod end 166. This connection enables the fitting 162 to rotate about the longitudinal axis of the bolt relative to the link body 164 as well as allowing some translational movement between the respective fittings 162 in directions approximately parallel to a plane prescribed by the skin panel 36.

Each of the rod ends 166 is attached to the linkage body 164 via a threaded connection 179. For example, the body 164 may include a tube having female threads (not shown) to receive a male-threaded end 166. The sense of the threads may be opposite at opposite ends of the link 154. That is, the threads at one end may be right-handed and at the other end, left-handed. This arrangement can permit extremely fine adjustment of linkage length when the link body 164 is turned with respect to the rod ends 166. Furthermore, the link body 164 may be turned after the rod ends 166 are fastened to the frame 12 and the skin panel 36. Thus, the location of the skin panel 36 may be adjusted with substantial precision while it is mounted to the space frame 12. No removal of the panel 36 is necessary. Alternatively, both threads may be of the same sense. In such a case, adjustments may be made, e.g., in half-turn increments after removing at least one end of the link 154 from the space frame 12 or skin panel 36. Jam nuts (not shown) could be used to lock each rod end 166 to the body 164. Alternatively, the connectors may be configured to rotatably receive a spherical bushing in the rod end that permits vertical and longitudinal motion of the panel 36 while constraining orthogonal motion of the panel 36. Such an arrangement using a spherical bushing as well as other various link and frame arrangements is disclosed in U.S. Pat. No. 8,128,025, the disclosure of which is hereby incorporated by reference in its entirety.

The standoff link 154 shown in FIG. 11 is attached to a support beam 156 and the truss element 16 of the frame 12. In this embodiment, the support beam 156 is an I-beam 180. The I-beam 180 has an inner flange 182 and an outer flange 184 that is parallel to the inner flange 182 and interconnected by a web 186 extending perpendicular between the flanges 182, 184 at their longitudinal center line. When the standoff link 154 is attached to the I-beam 180, the base plate 168 is positioned on the inner flange 182 such that one pair of apertures 170 is located near one longitudinal end 188 of the inner flange 182 and the other pair of apertures are located near the opposite longitudinal end 188. Bolts 190 extend through the apertures and through the inner flange to fasten the fitting 162 to the I-Beam 180. Bolts 190 (FIG. 15) also extend through the holes 170 and into the truss element 16 to fasten the other fitting 162 to the truss element 16. The axis 178 of rotation of each of fittings 162 relative to the link body 164 is oriented laterally relative to the flanges 182 of the I-beam 180. Alternatively, the axis 178 of rotation may be oriented a directions other than laterally relative the flanges 182.

Figure 12:
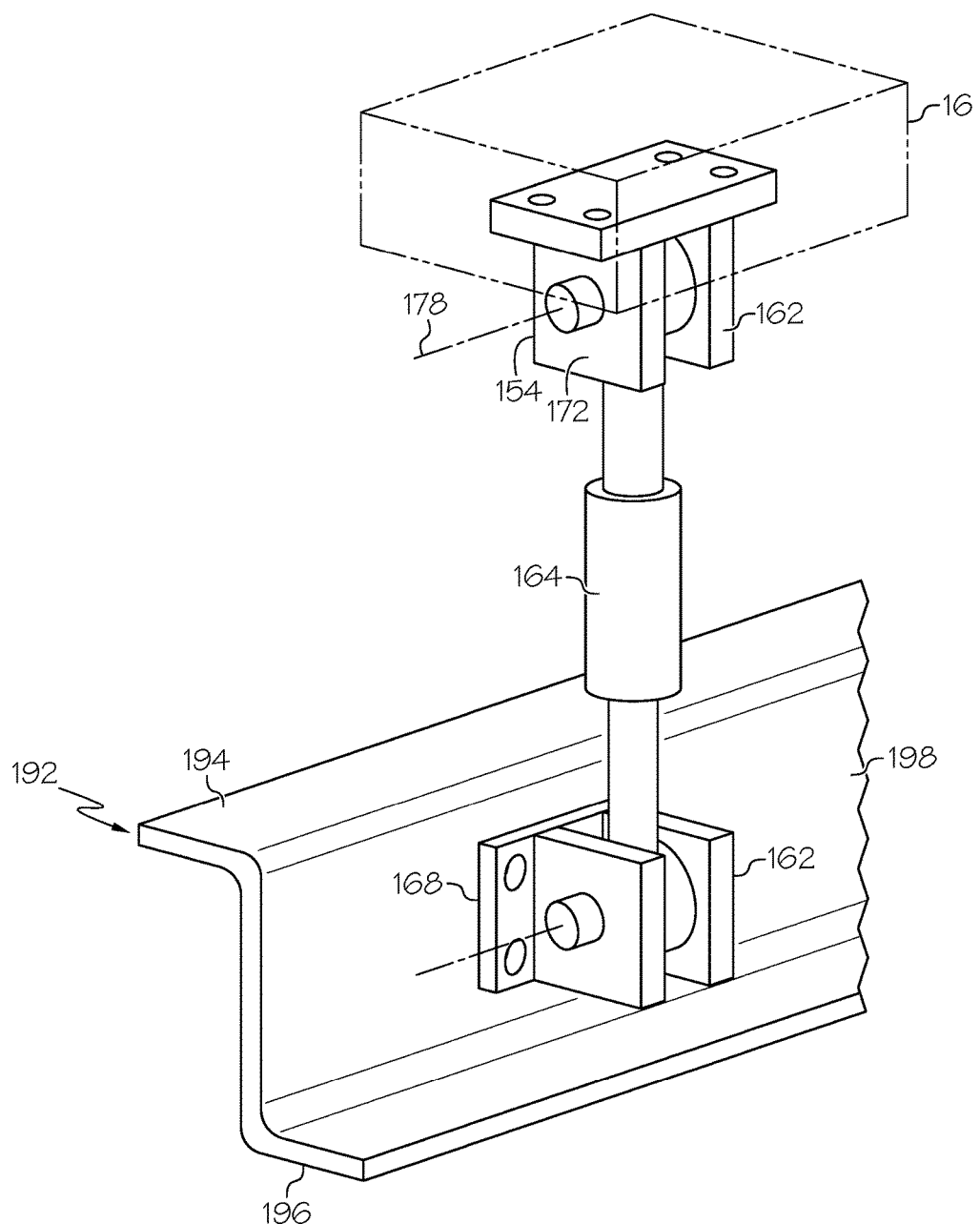
FIG. 12 is a perspective view of the standoff link connected to a Z-beam and truss element according to another embodiment.

FIG. 12 illustrates the standoff link 154 attached to a support beam 156 and the truss element 16 of the frame 12. In this embodiment, the support beam 156 is a Z-beam 192. The Z-beam 192 includes parallel inner and outer flanges 194, 196 that are interconnect at their ends by a web 198. The flanges 194, 196 extend perpendicular from the web 198 in opposite directions away from each other. When the standoff link 154 is attached to the Z-beam 192, the base plate 168 is positioned on the web 198 such that the two pairs of holes 170 are spaced longitudinally, relative to the web 198, from each other. The bolts 190 extend through the apertures 178 and through the web 198 to fasten the connector 162 to the Z-Beam 192. The axes 178 of rotation of each of fittings 162 relative to the link body 164 is oriented longitudinally relative to the Z-beam 192.

Figure 13:
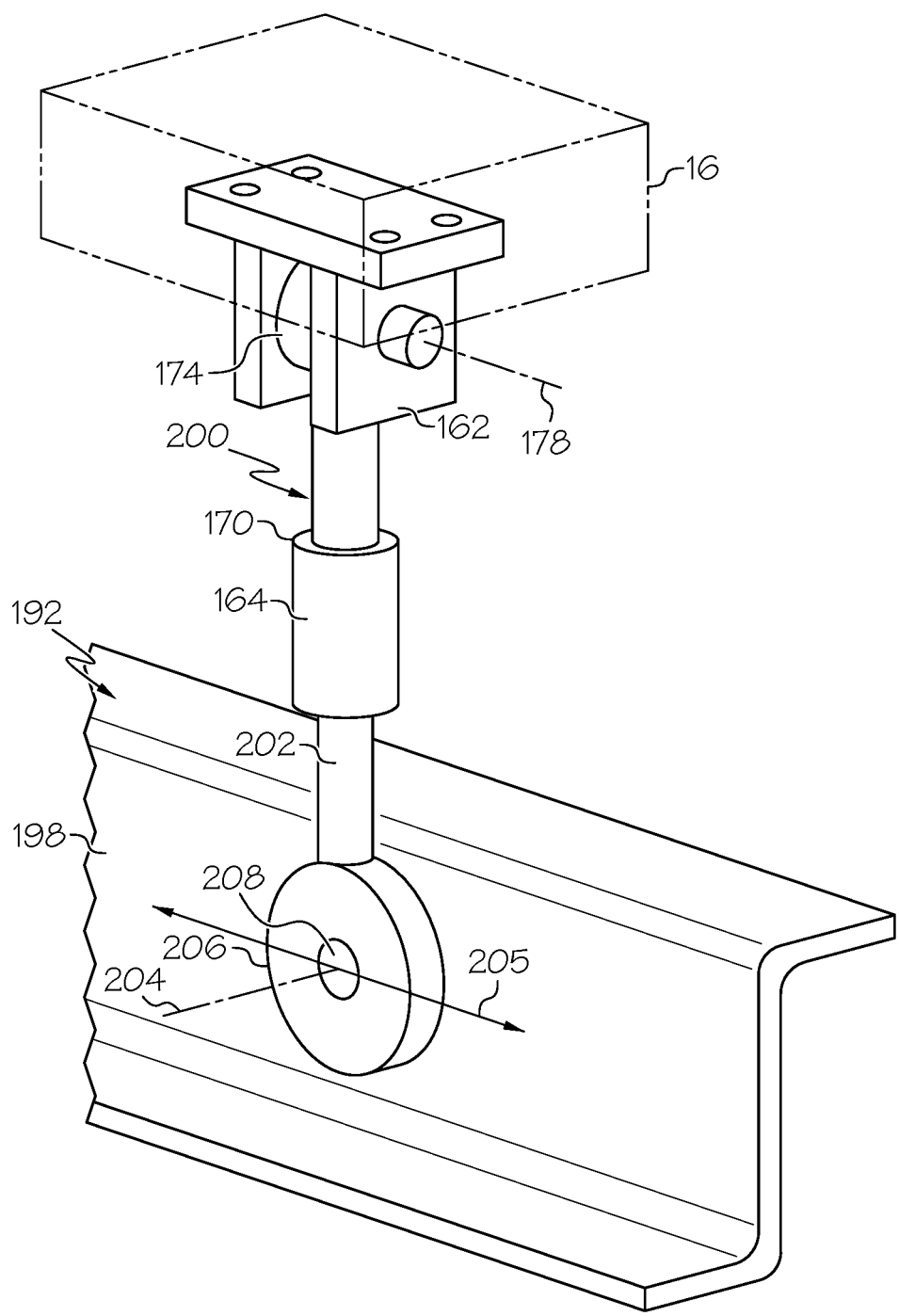
FIG. 13 is a perspective view of the standoff link connected to a Z-beam and truss element according to another embodiment.

FIG. 13 illustrates a different arrangement of a standoff link 200 that is attached to the Z-beam 192 and truss element 16. The embodiment shown in FIG. 13 is similar to the embodiment illustrated in FIG. 12 except for the different subject matter described below. Elements in the embodiment illustrated in FIG. 13 that are similar in structure and function to the embodiment illustrated in FIG. 12 will be described with the same reference numbers.

The standoff link 200 includes the link body 164 and two rod ends 166, 202. One rod end 202 includes a cylindrical head that defines a shear link 206. The shear link 206 is rotatably mounted flush against the web 198 of the Z-beam 192 such that a bolt 208 slidably extends through the center of the shear link 206 and the web 198 of the Z-beam to rotatably mount the shear link 206 to the web 198. The other rod end 166 includes the rotation head 174 that is rotatably connected to the fitting 162 that is of similar construction as that in embodiment shown in FIG. 12. Each of the rod ends 166, 202 is attached to the linkage body 164 via the threaded connection 178.

The shear link 206 enables the load path to act directly on the web 198 of the Z-beam 192. The axis 204 of rotation of the shear link 206 is perpendicular to the plane of the web 198, and the axis 178 of rotation of the fitting 162 is parallel to the longitudinal axis of the Z-beam 192. Thus, when the Z-beam 192 is mounted to the skin panels 36 in the vertical direction, the fitting 162 allows movement of the skin panels 36 and the Z-beam 192 in the horizontal direction relative to the frame 12, and the shear link 206 allows movement of the skin panels 36 and the Z-beam in the horizontal direction relative to the frame 12. Rotation of the shear link 206 and thereby the standoff link 200 about rotation axis 205 can be achieved by having the surface between the shear link 206 be slightly convex so that it is not flush with the web 198.

Figure 14:
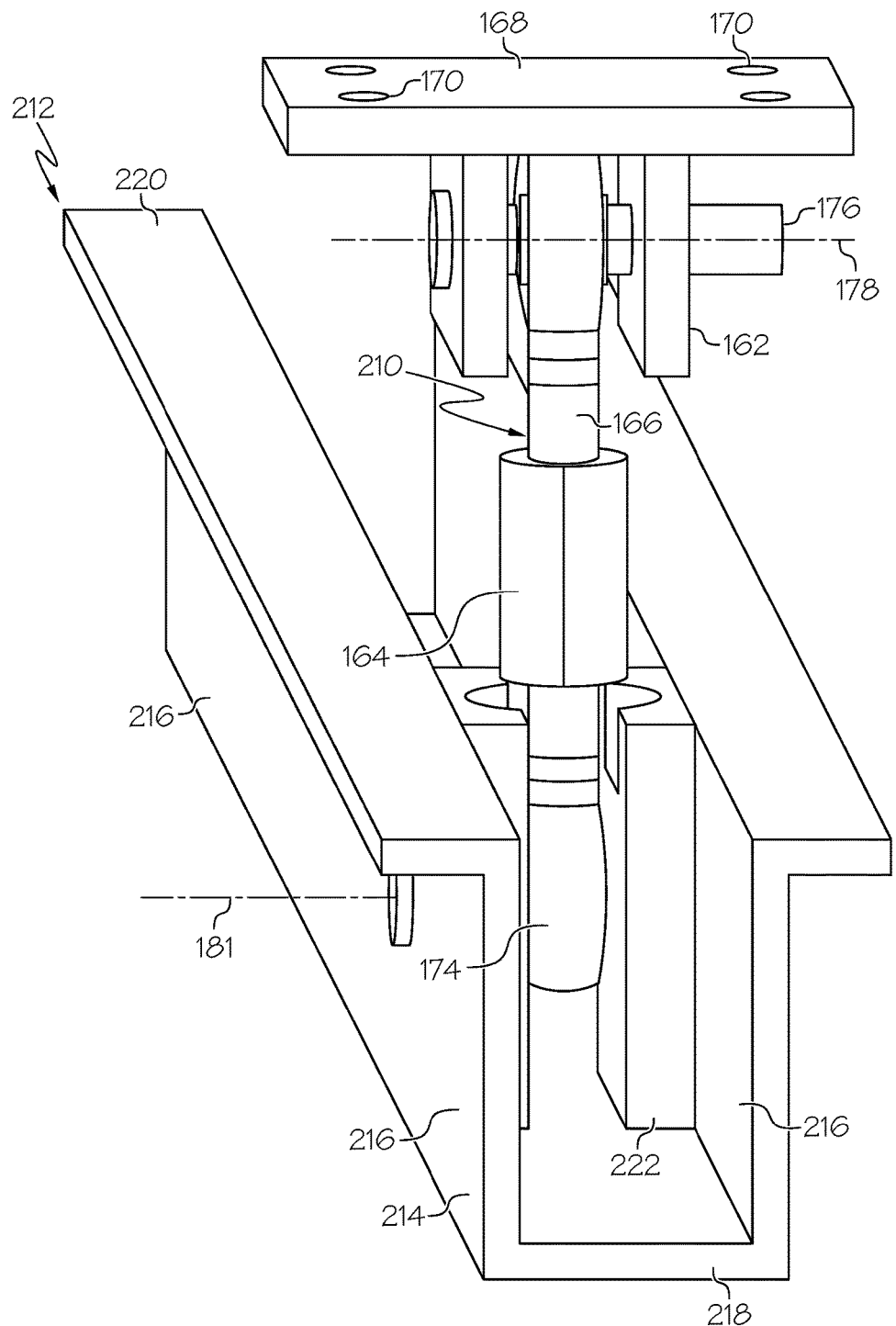
FIG. 14 is a perspective view of the standoff link connected to a U-beam according to another embodiment.
Figure 15:
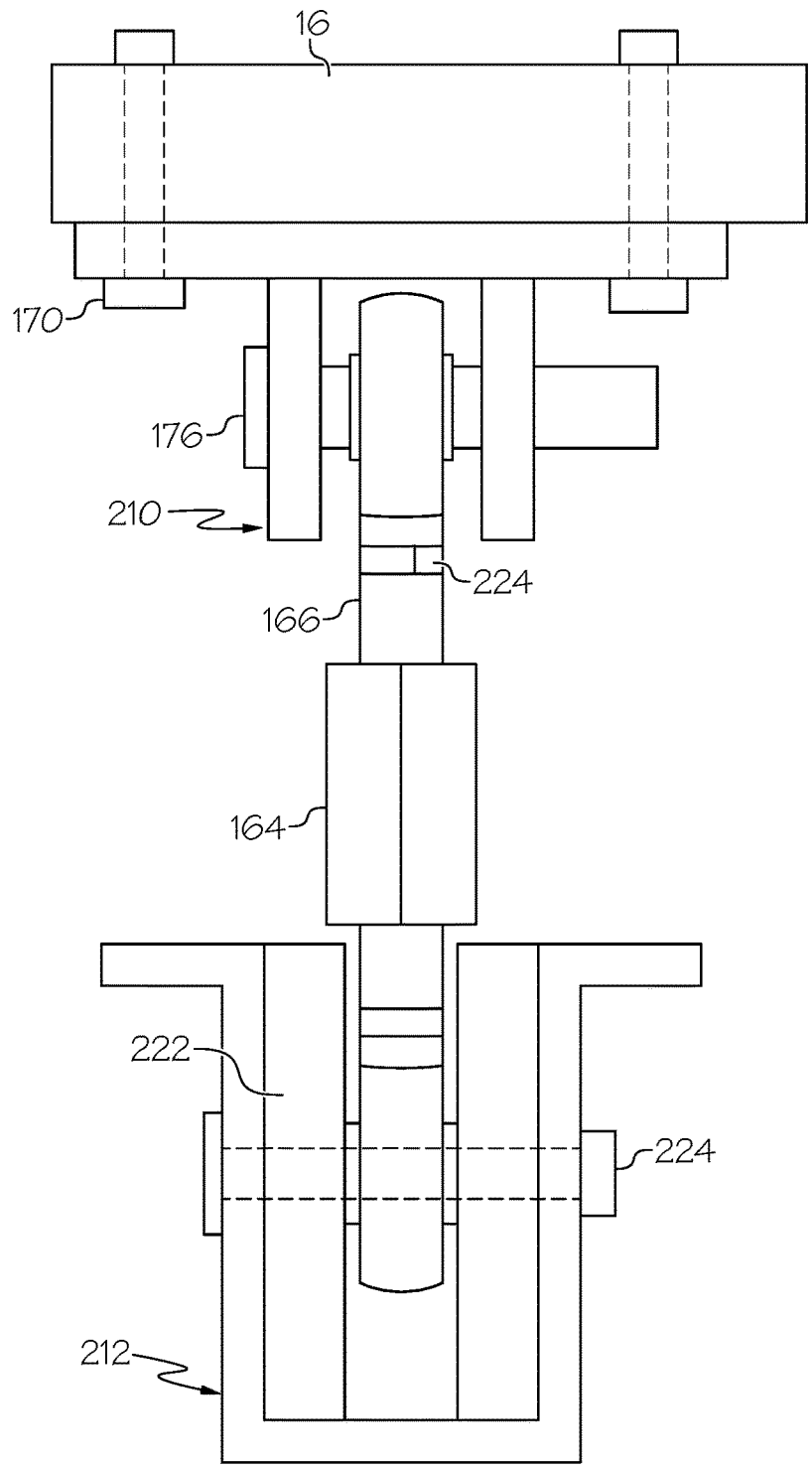
FIG. 15 is a side view of the standoff link connected to the U-beam of FIG. 14 and a truss element.

FIGS. 14 and 15 illustrate a different arrangement of a standoff link 210 attached to a support beam 156 and the truss element 16 (FIG. 15) of the frame 12. The embodiment shown in FIGS. 14 and 15 is similar to the embodiment illustrated in FIG. 11 except for the different subject matter described below. Elements in the embodiment illustrated in FIGS. 14 and 15 that are similar in structure and function to the embodiment illustrated in FIG. 11 will be described with the same reference numbers. In this embodiment, the support beam 156 is a U-beam 212. The U-beam 212 includes a web 214 that has opposing side walls 216 that extend perpendicularly from the longitudinal ends of a flat base 218. Flanges 220 are formed on respective ends of the side walls 220 and extend away from each other in a direction that is parallel to the base 218. This standoff link 210 includes the link body 164 and the two rod ends 166. One rod end 166 includes the toroid shaped rotation head 174. The rotation head 174 is attached directly to the U-beam 212. In particular, the rotation head 174 is positioned between the side walls 220. Doublers 222 are placed on opposite sides of the head 174. Bolt 176 slidably extends through the side walls 220 and doublers 222 and a nut 224 (FIG. 15) may be fastened to the end of the bolt 176 to rotatably mount the rotation head 174 to the side walls 220 of the web 214 of the U-beam 212. The doublers 222 act as a spacer to help transfer the axial load from the standoff link 210 to the U-beam instead of to the bolt 176 to avoid the bending of the bolt 176.

The other rod end 166 includes the rotation head 174 that is rotatably connected to the fitting 162 that is of similar construction as that shown in FIG. 11. Each of the rod ends 166 is attached to the linkage body 164 via a threaded connection 216. The axes 178, 181 of rotation of the fitting 162 and rotation head 174 is parallel to the lateral axis of the base 218 and perpendicular to the longitudinal axis of the U-beam 212. Alternatively, a rod end associated with the fitting and fitting itself may be oriented such that the axis of rotation of the fitting is parallel to the longitudinal axis of the U-beam Alternatively, the rotation head may be a spherical bushing and/or the fitting may be configured to rotatably receive a spherical bushing in the rod end 166 that permits vertical and longitudinal motion of the panel 36 while constraining orthogonal motion of the skin panel 36.

The fuselage skin panel, including the links, will be designed with a typical factor of safety. However, a small portion 224 (FIG. 15) of the standoff link 154, 200, 210 will be purposefully designed to fail at conditions that exceed the typical loads. For example, the link will be designed to fail if an object within the fuselage explodes. Instead of the explosion affecting all of the fuselage skin panels, only panels close to the explosion will fail. This feature provides for a structure that is more robust in the event of such an event.

The H-fittings and standoff links permit the skin panels 36 link to move slightly with respect to one another in a plane parallel to the skin panel 36 without imposing a load on the skin panel 36. Thus, the space frame 12 can have relatively large in-plane deflections without imposing a load on the skin panel 36. Relative motion in the in-plane direction could result in a slight non-orthogonality of the links, thereby causing a small change in the orthogonal location of the skin panel 40 with respect to the space frame 12. In such case, however, inherent out-of-plane flexibility of the skin panel 36 would typically render the loads imposed by such displacement negligible. Also, since the adjacent ends 96 of the first and second skin panels connected by the H-fitting are along the same plane, there is no eccentric loading on the first and second skin panels.

The H-fittings in the embodiments are associated with skin panels 36 for a fuselage. However, those skilled in the art will appreciate that various types of work pieces other than skin panels may be utilized, whether for aerospace applications or non-aerospace applications, without departing from the scope of the present disclosure.

Figure 16:
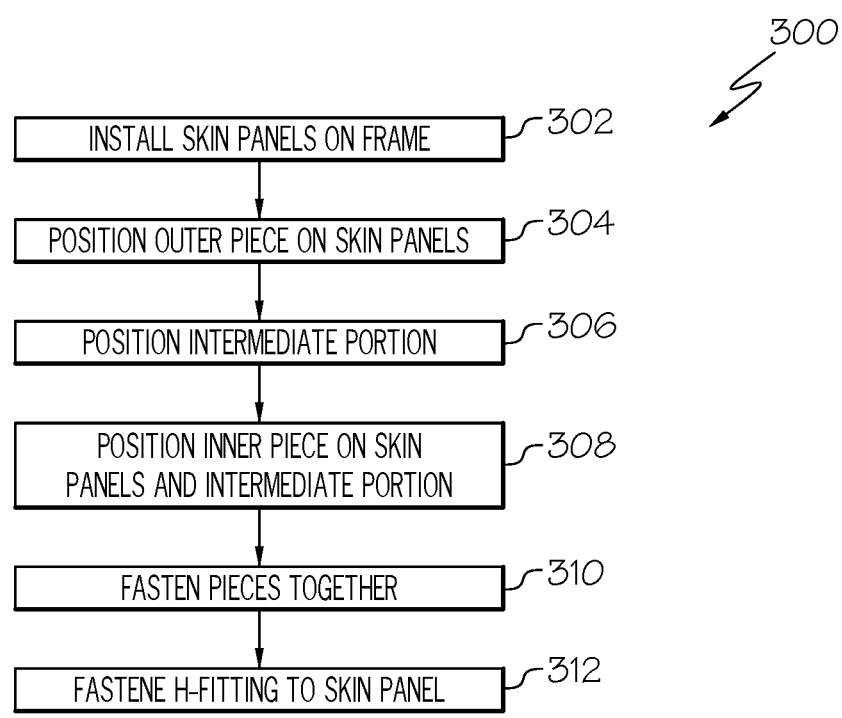
FIG. 16 is flow diagram of the method for installing an H-fitting to first and second skin panels according to various embodiments.

FIG. 16 shows a method 300 of installing the H-Fitting 50, 90, 112 to the skin panels 36. In step 302, the skin panels 36 are installed over the frame 12 of a fuselage such that the skin panels 36 are spaced apart from each other by the gap 98. The skin panels 36 are connected to the space frame 12 through the support beams 156 and the standoff links 154. In step 304, the outer piece 52, 126 of the H-fitting 50, 90, 112 is positioned on the outer surface 31 of adjacent skin panels 36 with the longitudinal center line 64 located between opposing ends 96 or 122 of adjacent skin panels 36. Then, in step 306, the intermediate portion 54, 92 is then positioned at the longitudinal center line 64 of the outer piece 52 and between the opposing ends 96 or 122 of the adjacent skin panels 36. Then, in step 308, the inner piece 56, 128 of the H-fitting 50, 90, 112 is position on the inner surface 33 of the skin panels 36 and the intermediate portion 54, 92 such that the intermediate portion 54, 92 is located along the longitudinal center line 76 of the inner piece 56, 128. Then, in step 310, a shaft 86 of the bolt 84 is inserted through the outer piece 52, 126, intermediate portion 54, 92, and inner piece 56, 128 until the head 88 of the bolt 84 abuts the exterior surface of the outer piece 52, 126. A nut 82 is then fastened on the threaded end of shaft 86 until it abuts the exterior surface of the inner piece 56, 128 to fasten the outer piece, intermediate portion 54, 92, and inner piece together such that the ends 96 or 122 of the skin panels 36 extend into their respective pockets 78, 80, separated by gaps 98 from the intermediate portion 54, 92. In step 312, the bolt 102 is inserted through the slot 106 and is fixed to the skin panel 36 to fasten the H-fitting 50, 90, 112 to the skin panel, while allowing movement of the skin panel 36 along the slot 106. Alternatively, the skin panels 36 may be connected to the space frame 12 through the support beams 156 and the standoff links 154 after the H-fittings 50, 90, 112 are installed.

Alternatively, the H-fitting may be assembled together first and then lifted to the top of the fuselage and positioned such that the intermediate portion is between opposing ends of the first and second skin panels attached to the fuselage. The H-fitting is then slid downward such that the ends of the first and second skin panels extend into their corresponding first and second pockets and the intermediate portion is separated from the ends by the gaps. In another alternative method, which may be performed for skin panels that are not be attached to the fuselage, the H-fitting may be assembled first and then the opposing ends of the skin panels are slidably inserted into the first and second pockets in the direction towards the intermediate piece until the ends are separated by the gaps. The assembled H-fitting and skin panels are then assembled to the fuselage. These alternative methods may also be performed for single piece H-fittings.

Figure 17:
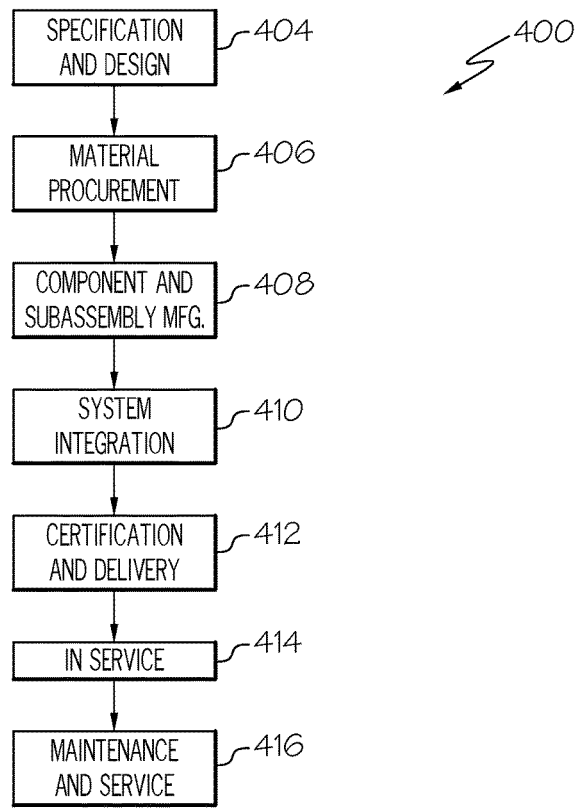
FIG. 17 is flow diagram of an aircraft manufacturing and service methodology.
Figure 18:
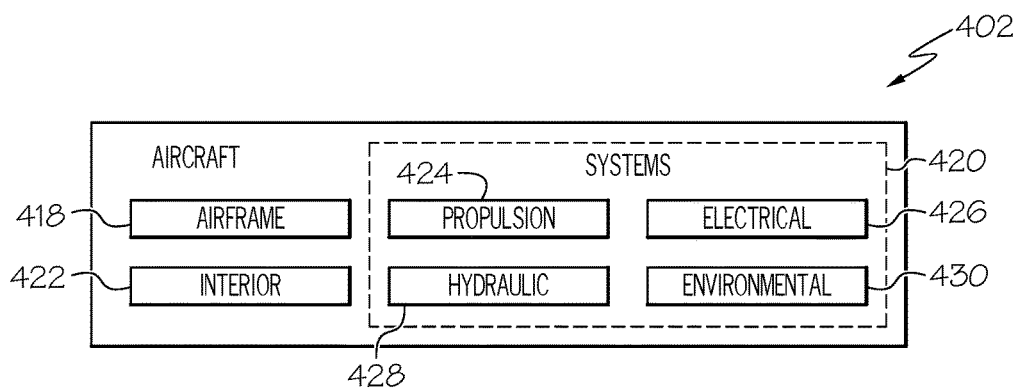
FIG. 18 is a block diagram of an aircraft.

Examples of the disclosure may be described in the context of an aircraft manufacturing and service method 400, as shown in FIG. 17, and an aircraft 402, as shown in FIG. 18. During pre-production, the aircraft manufacturing and service method 400 may include specification and design 404 of the aircraft 402 and material procurement 406. During production, component/subassembly manufacturing 408 and system integration 410 of the aircraft 402 takes place. Thereafter, the aircraft 402 may go through certification and delivery 412 in order to be placed in service 414. While in service by a customer, the aircraft 402 is scheduled for routine maintenance and service 416, which may also include modification, reconfiguration, refurbishment and the like.

Each of the processes of method 400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, single individual, and so on.

As shown in FIG. 18, the aircraft 402 produced by example method 400 may include an airframe 418 with a plurality of systems 420 and an interior 422. Examples of the plurality of systems 420 may include one or more of a propulsion system 424, an electrical system 426, a hydraulic system 428, and an environmental system 430. Any number of other systems may be included such as weapons and electronics.

The disclosed skin panel connection system may be employed during any one or more of the stages of the aircraft manufacturing and service method 400. As one example, the disclosed skin panel connection system may be employed during material procurement 406. As another example, components or subassemblies corresponding to component/subassembly manufacturing 408, system integration 410, and or maintenance and service 416 may be fabricated or manufactured using the skin panel connection system. As another example, the airframe 418 and/or the interior 422 may be constructed using the disclosed skin panel connection system. Also, one or more apparatus examples, method examples, or a combination thereof may be utilized during component/subassembly manufacturing 408 and/or system integration 410, for example, by substantially expediting assembly of or reducing the cost of an aircraft 402, such as the airframe 418 and/or the interior 422. Similarly, one or more of system examples, method examples, or a combination thereof may be utilized while the aircraft 402 is in service, for example and without limitation, to maintenance and service 416.

The disclosed skin panel connection system are described in the context of an aircraft; however, one of ordinary skill in the art will readily recognize that the disclosed skin panel connection system may be utilized for a variety of vehicles, as well as for non-vehicle applications. For example, implementations of the embodiments described herein may be implemented in any type of vehicle including, e.g., passenger and military ships, spacecraft, automobiles and the like.

Although various embodiments of the disclosed skin panel connection system have been shown and described, modifications may occur to those skilled in the art upon reading the specification. The present application includes such modifications and is limited only by the scope of the claims.

What is claimed is:

1. An aircraft comprising:
a plurality of truss elements configured to form a space frame fuselage;
a plurality of skin panels connected with said truss elements and configured to form a skin over said space frame fuselage, said skin panels movable relative to one another so as to prevent loading of said space frame fuselage from inducing loading in the skin; and
a fitting, wherein said fitting comprises a first intermediate portion, wherein said fitting comprises a first outer portion and a first inner portion, wherein said first outer and inner portions are spaced apart from each other and interconnected by said first intermediate portion, wherein said skin panels comprise first and second skin panels that are adjacent to each other, wherein said first skin panel has a first end portion, where said second skin panel has a second end portion adjacent said first end portion, wherein said fitting is positioned on said first and second skin panels such that said first and second end portions extend between said first inner and outer portions, wherein said fitting is configured to enable said first and second skin panels to move towards each other along a first plane of first outer and inner surfaces of said first and second skin panels while constraining non-planar movement of said skin panels with respect to said first plane.

2. The aircraft of claim 1 wherein said first intermediate portion is positioned between said first and second end portions, wherein each of said first and second end portions is spaced from said first intermediate portion by a gap.

3. The aircraft of claim 2 wherein said first outer portion comprises a first surface facing said first skin panel, wherein said first inner portion comprises a second surface facing said first skin panel, wherein said first surface and said second surface converge toward each other in the direction towards said first intermediate member to define a wedge configuration.

4. The aircraft of claim 1 wherein said fitting is secured to said first skin panel by a fastener, wherein said fitting comprises a slot, wherein said slot slidably receives said fastener, wherein said fastener is movable along said slot to allow said first skin panel to move along said first plane while remaining fasten to said first skin panel.

5. The aircraft of claim 1 further comprising a corner fitting assembly, wherein said corner fitting comprises a plurality of fitting portions connected to each other and spaced from each other around a periphery of said corner fitting, wherein the corner fitting assembly is surrounded by a group of said skin panels, wherein said skin panels of said group of said skin panels comprises third and fourth skin panels that are adjacent to each other, wherein said third skin panel has a third end portion, wherein said fourth skin panel has a fourth end portion that is adjacent to said third end portion, each of said fitting portions comprises a second intermediate portion and second outer and inner portions, wherein said second outer and inner portions are spaced apart from each other and interconnected by said second intermediate portion, wherein at least one of said fitting portions is positioned on said third and fourth skin panels such that said third and fourth end portions extend between said second inner and outer portions, wherein said one of said fitting portions is configured to enable said third and fourth skin panels to move towards each other along a second plane parallel to second outer and inner surfaces of said third and fourth skin panels while constraining non-planar movement of said third and fourth skin panels with respect to said second plane.

6. The aircraft of claim 5 wherein said fitting is positioned adjacent said corner fitting assembly, wherein said corner fitting assembly comprises a first flange member, wherein said fitting comprises a second flange member, wherein said first and second flange member are connected to each other by a fastener.

7. The aircraft of claim 1 comprising a support beam and a standoff link, wherein said support beam is attached to said inner surface of said first skin panel, wherein said outer surface of said first skin panel has a substantially smooth surface, wherein said standoff link has a first end to said support beam, wherein said standoff link has as second end movably connected to one of said truss elements, said support beam further configured to transfer loading of said first skin panel through said standoff link to said space frame fuselage, wherein the movable connection of said second end of said standoff link is configured to constrain motion of said first skin panel in a direction orthogonal to said fuselage while permitting at least one of vertical and longitudinal motion or both vertical and longitudinal motion of said first skin panel relative to said fuselage.

8. The aircraft of claim 1 comprising a support beam that is U-shaped and a standoff link, wherein said support beam comprises a web, wherein said web comprises opposite first and second side walls, wherein said support beam is attached to said inner surface of said first skin panel, wherein said standoff link has a first end connected to one of said truss elements, wherein said standoff link has a second end positioned between said first and second side walls and movably connected to said first and second side walls, wherein said support beam is further configured to transfer loading of the first skin panel through said standoff link to said space frame fuselage, wherein the movable connection of said second end of said standoff link configured to constrain motion of the panel in a direction orthogonal to the fuselage while permitting at least one of vertical and longitudinal motion or both vertical and longitudinal motion of the first skin panel relative to the fuselage.

9. The aircraft of claim 8 comprising first and second support members, wherein said first support member is positioned between said second end and said first side wall, wherein said second support member is positioned between said second end and said second side wall, wherein said second end is movably connected to said first and second side walls by a fastener, said wherein said support members are configured to help transfer the load from said standoff link to said support beam.

10. The aircraft of claim 1 wherein said first and second end portions oppose each other.

11. An aircraft comprising:
a plurality of truss elements configured to form a space frame fuselage;
a plurality of skin panels connected with said truss elements and configured to form a skin over said space frame fuselage, said skin panels movable relative to one another so as to prevent loading of said space frame fuselage from inducing loading in the skin;

a support beam, wherein said support beam is attached to a plurality of said skin panels;

a fitting comprising an intermediate portion, wherein said fitting comprises an outer portion and an inner portion, wherein said outer and inner portions are spaced apart from each other and interconnected by said intermediate portion, wherein said skin panels comprise first and second skin panels that are adjacent to each other, wherein said first skin panel has a first end portion, where said second skin panel has a second end portion adjacent said first end portion, wherein said fitting is positioned on said first and second skin panels such that said first and second end portions extend between said inner and outer portions, wherein said fitting is configured to enable said first and second skin panels to move towards each other along a plane of outer and inner surfaces of said first and second skin panels while constraining non-planar movement of said skin panels with respect to said plane;

a standoff link, wherein said standoff link has a first end movably connected to said support beam, wherein said standoff link has as second end movably connected to one of said truss elements, said support beam further configured to transfer loading of at least one of said skin panels through said standoff link to said space frame fuselage, wherein the movable connection of said second end of said standoff link is configured to constrain motion of said at least one of said skin panels in a direction orthogonal to said fuselage while permitting at least one of vertical and longitudinal motion or both vertical and longitudinal motion of said at least one of said skin panels relative to said fuselage; and wherein said standoff link comprises a portion configured to fail at abnormal loads applied to said standoff link.

12. The aircraft of claim 11 wherein said support beam is U-shaped, wherein said support beam comprises a web, wherein said web comprises opposite first and second side walls, wherein said support beam is attached to an inner surface of a said skin panel, wherein said first end of said standoff link is positioned between said first and second side walls and movably connected to said first and second side walls.

13. The aircraft of claim 12 comprising first and second support members, wherein said first support member is positioned between said first end of said standoff link and said first side wall, wherein said second support member is positioned between said first end of said standoff link and said second side wall, wherein said first end is movably connected to said first and second side walls by a fastener, wherein said first and second support members are configured to help transfer the load from said standoff link to said support beam.

14. The aircraft of claim 11 wherein said first end of said standoff link comprises a shear link, wherein said shear link is rotatably connected to said support beam.

15. The aircraft of claim 11 wherein said first end is rotatably connected to said support beam by a first bolt, wherein said first bolt extends through said first end, wherein said second end is rotatably connected to said truss element by a second bolt, wherein said second bolt extends through said second end.

16. A method comprising:
  installing a plurality of skin panels over a frame of a fuselage such that the skin panels are spaced apart from each other by a first gap;
  installing a fitting on adjacent first and second skin panels, wherein the fitting is configured to enable the first and second skin panels to move towards each other along a plane of outer and inner surfaces of the first and second skin panels while constraining non-planar movement of the skin panels with respect to the plane, wherein installing the fitting between adjacent first and second skin panels comprises:
  positioning an outer piece of the fitting on the outer surface of the skin panels over the first gap;
  positioning an intermediate portion of the fitting between the first and second skin panels at the first gap;
  positioning an inner piece of the fitting on the intermediate portion such that a first end portion of the first skin panel extends between the outer and inner pieces and a second end portion of the second skin panel extends between the outer and inner pieces; and
  fastening the outer piece, intermediate portion, and inner piece together.

17. The method of claim 16 wherein positioning the inner piece on the intermediate portion such that a first end portion of the first skin panel extends between the outer and inner pieces and a second end portion of the second skin panel extends between the outer and inner pieces comprises spacing the first end portion of the first skin panel at a second gap from said first intermediate portion.

18. The method of claim 16 comprising securing the fitting to the first skin panel by a fastener.

19. The method of claim 16 comprising:
  attaching a support beam to the inner surface of the first skin panel;
  connecting a first end of a standoff link to the support beam; and
  connecting a second end of the standoff link to a truss element of a space frame fuselage, wherein the support beam is configured to transfer loading of the first skin panel through the standoff link to the space frame fuselage, wherein the connection of the second end of the standoff link is configured to constrain motion of the first skin panel in a direction orthogonal to the fuselage while permitting at least one of vertical and longitudinal motion or both vertical and longitudinal motion of the first skin panel relative to the fuselage.

20. The aircraft of claim 1 wherein said first intermediate portion comprises a cylindrical spacer sandwiched between said first outer portion and said first inner portion.

* * * * *